United States Patent Office 2,969,707
Patented Jan. 31, 1961

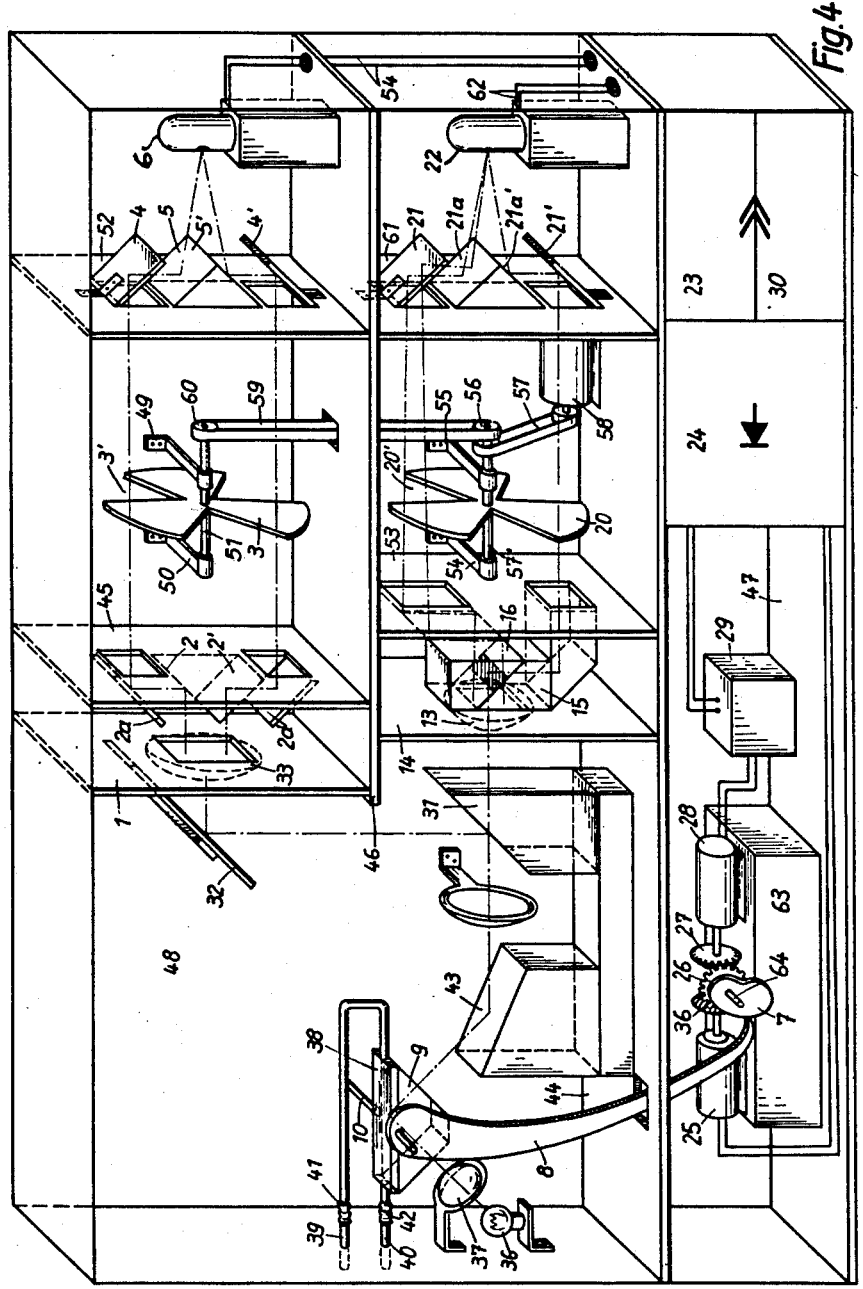

2,969,707

METHOD AND MEANS FOR AUTOMATICALLY ADJUSTING A MEASURING OR OBSERVATION INSTRUMENT

Gerhard Hansen, Heidenheim, Wurttemberg, Germany, assignor to Carl Zeiss, Oberkochen, Wurttemberg, Germany Filed May 4, 1956, Ser. No. 582,813

Claims priority, application Germany May 7, 1955

8 Claims. (Cl. 88—14)

The present invention relates to a method and device for automatically adjusting a measuring or observation instrument to the point of the greatest local change in the illumination intensity of a radiation field.

In the methods heretofore employed there is used for the adjustment of predetermined illumination intensity in the viewing field of the observation instrument. This well-known method, however, has the disadvantage that there is present, a systematic dependence of the adjustment from the absolute value of this illumination intensity. This value however, may change during the course of the measurement so that an incorrect or misleading adjustment will take place.

It is an object of the present invention to eliminate this disadvantage and for this purpose there is employed for the adjustment the first and second differential quotient of the light flux emitted by the radiation field. Under the first differential quotient is understood the first diversion of the light flux $\phi$ after the angle of rotation $\alpha$ of the observation instrument, while under second differential quotient is understood the second diversion of the light flux $\phi$ after the angle of rotation $\alpha$ of the observation instrument. For the adjustment there are employed two electric motors. One motor is employed for the coarse adjustment and for this purpose the motor is energized by a constant voltage which is connected and disconnected respectively, when an electric quantity which is proportional to the first differential quotient of the light flux falls below or exceeds an adjustable minimum or maximum value, respectively. The second electric motor is used for a fine adjustment. The electrical control quantity fed to the mentioned second motor is proportional to the second differential quotient of the light flux. The electric motor employed for the coarse adjustment rotates with constant angular speed so that the radiation field is scanned continuously. This motor will be disconnected when the electrical quantity which is proportional to the first differential quotient of the light flux exceeds an adjustable maximum value. When this takes place the other motor employed for the fine adjustment is put into operation. This fine adjustment motor is sensitive to the phase changes and is also sensitive to changes in amplitudes. It will not rotate but will stop as soon as the second differential quotient of the light flux becomes zero, that is, when the instrument has ben adjusted to the point of the greatest local change in the illumination intensity. When a change in the radiation field takes place which is connected with a displacement of the point of the greatest local change in the illumination intensity then the electrical quantity which is proportional to the first differential quotient of the light flux is below a minimum value so that the other motor performing the coarse adjustment is again set into operation. When this takes place the radiation field is again scanned continuously. If the direction of rotation of the motor is incorrect, that is if the motor reaches an end position without achieving that the electrical quantity which corresponds to the first differential quotient of the light flux exceeds a predetermined adjusted maximum value, then the direction of the rotation of the motor is reversed automatically by a limit switch or by a manual operation. It is also possible to have the motor rotate in the same direction after reaching an end position whereby, however, the control mechanism serving for scanning of the radiation field is recoiling to the starting position automatically.

The adjustment of the measuring or observation instrument may be effected by the adjustment of shutters in the focal plane of the image forming lens. In many cases, however, it is advisable to employ for the purpose of adjustment a displacement of the radiation field itself, which may be effected by the movement of suitable optical means, for instance, by rotating a mirror or prism.

An important object of the invention resides in the provision of means for producing electrical quantities, particularly voltages which are proportional to the first and second differential quotient, respectively, of the light flux emanating from the radiation field. An arrangement for producing a voltage which is proportional to the first differential quotient of the light flux consists, according to the present invention, in that there are provided in the light beam emanating from the radiation field two parallel slits of the same width and that the light beams passing through these slits are alternately interrupted by an alternating light shutter, whereupon both light beams are conducted by means of suitable optical members to a common radiation receiver. The latter furnishes then an alternating voltage which is employed for the connection and disconnection of the electric motor employed for the coarse adjustment of the instrument.

An arrangement for producing an electrical quantity which is proportional to the second differential quotient of the light flux according to the present invention is provided with three parallel slits arranged in the light beam emanating from the radiation field. The center one of these three slits is twice as wide as the two outer ones. The two light beams passing through the two outer slits are both interrupted at the same time alternately with the light beam passing through the center slits by means of an alternating light shutter, and thereafter the light beams are conducted to a common radiation receiver. The voltage generated by the last mentioned radiation receiver is then amplified and rectified in synchronism with the interruptions of the light beams. This rectified voltage serves for energizing the fine adjustment motor.

The invention is illustrated in the accompanying drawings wherein:

Fig. 4 shows a side view of a refractometer according to the invention, the front wall having been removed.

Figure 1:
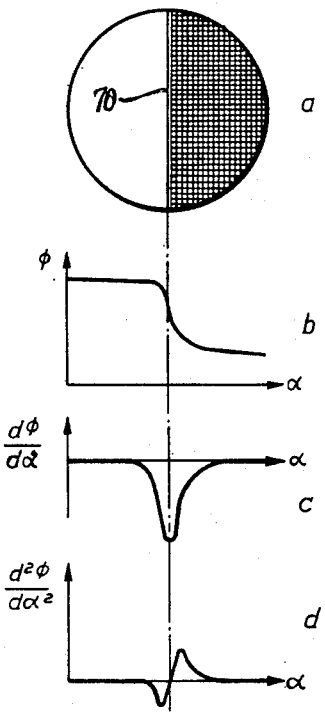
Fig. 1(a) illustrates the radiation field of a refractometer.
Fig. 1(b) illustrates the characteristic of the light flux emanating from the radiation field as a function of the angle of rotation of the viewing instrument.
Fig. 1(c) is a characteristic of the first differential quotient of the light flux as a function of the angle of rotation of the viewing instrument.
Fig. 1(d) shows the characteristic of the second differential quotient of the light flux as a function of the angle of rotation of the viewing instrument.

Referring to the drawings, there is illustrated in Fig. 1(a) the radiation field of a refractometer; Fig. 1(b) illustrates the characteristic of the light flux $\phi$ emanating from said radiation field as a function of the angle of rotation $\alpha$ of the viewing instrument and it will be noted from this characteristic that the transition from the maximum brightness to the minimum brightness takes place within a certain limited range; Fig. 1(c) illustrates the characteristic of the first differential quotient of the light flux $\phi$ again as a function of the angle of rotation $\alpha$ of the viewing instrument. The first differential quotient has its greatest value at that point where the light flux changes to the maximum degree with the angle of rotation. This feature, however, is not suitable for being used for the control of the driving motor without additional means, because the maximum height of the characteristic of the first differential quotient depends from the absolute value of the radiation intensity.

Fig. 1(d) illustrates the characteristic of the second differential quotient of the light flux $\phi$ as a function of the angle of rotation $\alpha$ of the instrument and it will be noted that the quotient will become zero at the point of the greatest change in the radiation intensity. At this point the second differential quotient changes its sign so that this function is suitable for adjustment of a driving motor to the point of the greatest change in the radiation intensity. At a greater distance away from this point, however, the value of the second differential quotient will become almost zero, so that it no longer can be used for the control of an adjusting motor.

According to the present invention not only the first but also the second differential quotient is used for adjusting a measuring or observation instrument to the point of the greatest local change in the illumination intensity of a radiation field. At the point of the greatest local change in the illumination intensity the first differential quotient will reach its maximum value. A coarse adjustment motor for connecting or disconnecting of which a voltage is used which is proportional to the first differential quotient of the light flux is connected with an adjustment member and which is driven with uniform speed for scanning the radiation field is disconnected as soon as the voltage has reached a predetermined preferably adjustable maximum value. At this point there is connected an electric motor, the direction of rotation of which is determined by the sign of the second differential quotient. This has the result that now the fine adjustment of the instrument takes place. At the point of the greatest local change in the illumination intensity the second differential quotient will become zero and therefore the fine adjustment motor is brought to a stop. The fine adjustment motor, however, is not adapted to be used alone for the control of the instrument since for instance during a change of the measuring object a displacement of the boundary line 70 as shown in Fig. 1(a) takes place and appears again at another angular position. If this is the case the first differential quotient will disappear temporarily. In accordance with the invention, however, the coarse adjustment motor is again set in operation when the control voltage decreases below a predetermined preferably adjustable value. The coarse adjustment motor again effects an adjustment of the observation instrument until a point is reached at which again the first differential quotient exceeds the adjusted maximum value.

Figure 2:
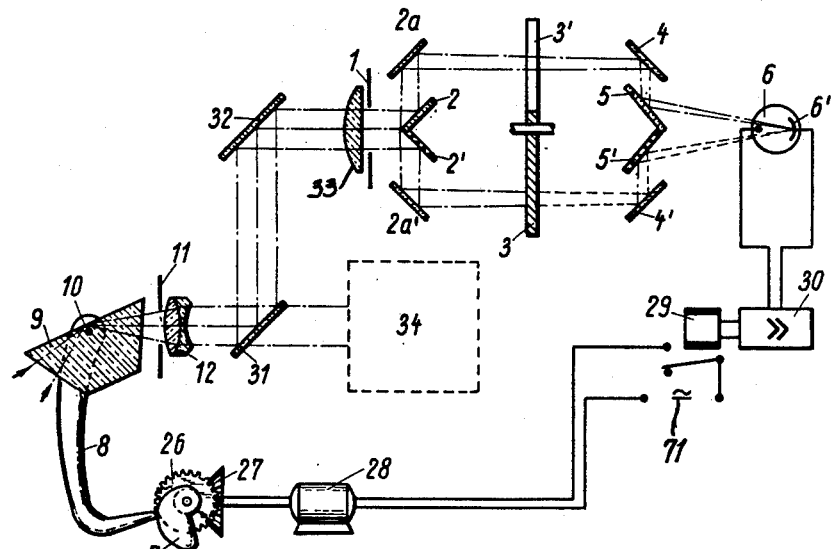
Fig. 2 illustrates diagrammatically the arrangement for producing a voltage which is proportional to the first differential quotient of the light flux, and also illustrates the control device for adjusting the instrument coarsely.

Fig. 2 shows, by way of example, an arrangement for producing a voltage which is proportional to the first differential quotient of the light flux. The light beam coming from measuring prism 9 passes through a slit 11 behind which a lens 12 is arranged. In the path of this light beam behind this lens 12 a partial reflecting mirror 31 is arranged through which part of the impinging light passes to the arrangement 34 which is further described in Fig. 3 while the other part of the impinging light is reflected to a mirror 32 by said mirror 31. From mirror 32 the light passes through a lens 33 which projects an image of the slit 11 onto the photo cathode 6' for photocell 6 through the slit 1. The light passing through the slit 1 is divided by the double mirror 2, 2', into two beams of similar width. The double mirror 2, 2' consists of two mirrors which are arranged at an angle with respect to each other and also both mirrors are arranged at an angle to the direction of the light beam passing through the slit 1. The two beams of light are directed from the two portions of the mirror 2 to two other reflecting mirrors 2a, 2a' and then are reflected by the latter parallel to the direction of the original beam of light to oppositely arranged reflecting mirrors, 4, 4' which in turn direct the two beams to the two portions of another reflecting mirror 5, 5' which reflects both beams of light onto the photo cathode 6' of the photoelectric cell 6. It will be noted, however, that there is arranged in the two parallel light beams between the two pairs of mirrors 2a, 4 and 2a', 4', a rotary shutter 3 with a marginal aperture 3' and this shutter alternately interrupts the two beams of light which are reflected by the mirrors 2a, 2a'. The voltage produced in the photoelectric cell 6 is transmitted to an amplifier 30 and from there to a relay 29. This relay serves for connecting and disconnecting a coarse adjustment motor 28 according to a predetermined maximum and minimum value. On the axis of the electric motor 28 which is energized by a constant voltage source 71, a bevel-gear 27 is arranged with engages another bevel-gear 26. This bevel-gear 26 is arranged on an axis together with a control cam 7. This control cam has the shape of an Archimedes' spiral and a lever 8 glides on its circumference. This lever 8 is rotatable around axis 10 and serves for turning the measuring prism 9.

Figure 3:
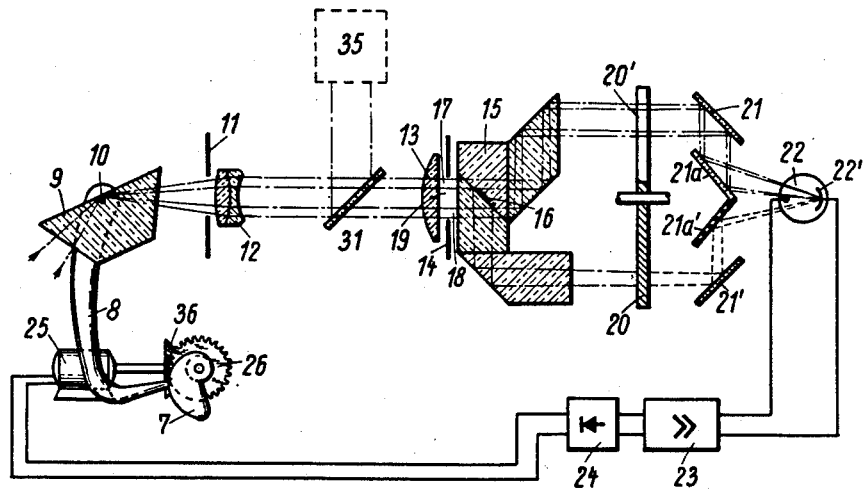
Fig. 3 illustrates diagrammatically an arrangement for producing a voltage which is proportional to the second differential quotient of the light flux and also illustrates the control device for adjusting the instrument finely.

Fig. 3 illustrates, by way of example, an arrangement for producing a voltage which is proportional to the second differential quotient of the light flux. The light beam entering and then leaving the measuring prism 9 passes through a slit 11 and then through a lens 12, the focal point of which lies on the partial reflecting separating face 16 of a prism 15. Behind said lens 12 a further lens 13 is arranged. This lens produces an image of the slit 11 on the photo cathode 22' of the photoelectric cell 22. In the rear of the lens 13 there is arranged a slit 44. A prism 15 is so arranged that as a result of its partial reflecting separating face 16 the light beam passing through the slit 14 is divided into three parts. The center part of this light beam is reflected downwardly so that in effect, three slits, 17, 18, and 19 are produced. The slits 17 and 18 are arranged symmetrically with respect to the slit 19 which latter is twice as wide as the two outer slits 17 and 18. The light beams passing through the outer slits 17 and 18 and also the light beam passing through the slit 19 are reflected by the prism 15 in such a manner that their axes are parallelly displaced with respect to the light entrance direction. The light beams passing through the outer slits 17 and 18 are interrupted both at the same time, but alternately with the light beam passing through the center slit by means of a rotary shutter disc 20, provided with a marginal aperture 20'. All of the light beams after having been reflected by the mirrors 21, 21' and the double mirror 21a, 21a' are conducted to the photo cathode 22' of the photoelectric cell 22.

The voltage produced by the photoelectric cell 22 is amplified in the amplifier 23 and then is rectified in the rectifier 24 in synchronism with the interruptions of the light fluxes by the shutter 20. The rectification has to take place in synchronism with the interruptions of the light beams by the shutter 20 in order that the fine adjustment motor 25, which is phase sensitive and amplitude sensitive, may rotate in one or the other direction, depending upon which one of the two separated light beams has the greater value, energizes the photoelectric cell 22.

The synchronous rectification in rectifier 24 can, e.g., be controlled by the mains frequency if a synchronous motor is used for rotating the alternating light shutter 20. If an optional electric motor is used for rotating the alternating light shutter 20 synchronizing impulses are taken from the alternating light shutter electromagnetically or electro-optically. These synchronizing impulses serve for synchronizing the rectifier 24.

From rectifier 24 the voltage is transmitted to a fine adjustment motor 25. This fine adjustment motor is connected with a bevel bear 26 which engages the bevel gear 26 described in connection with Fig. 2. The arrangement is such that after disconnecting the coarse adjustment motor 28, the fine adjustment motor alone takes over the rotation of control cam 7 and thus rotation of measuring prism 9.

In Fig. 3 the arrangement shown in Fig. 2 is marked 35.

In Fig. 4 the side view of a refractometer constructed according to the invention is shown, the front wall of the instrument having been removed. On an intermediate floor 44 the arrangement shown in Fig. 3, for producing a voltage proportional to the second differential quotient of the light flux emanating from the radiation field is arranged while the arrangement, shown in Fig. 2, for producing a voltage proportional to the first differential quotient of said light flux is arranged on an intermediate floor 46. The light coming from light source 36 passes to the measuring prism 9 through a lens 37. The measuring surface of the measuring prism supports a flow cell 38 whose feed and delivery pipe are marked 39 and 40. By means of the intermediate pieces 41 and 42 the feed and delivery pipes can be turned. The light leaving the measuring prism 9 is reflected to a partial reflecting mirror 31 by a mirror 43. That part of the light which is reflected by this partial reflecting mirror 31 is fed through a lens 33 to entry slit 1 by a mirror 32. Said slit 1 is arranged in an intermediate wall. On another intermediate wall the mirrors 2, 2a, 2' and 2a' are arranged. The alternating light shutter 3 is pivoted by means of device 49 and 50 and at the same time connected with the back wall 48 of the housing. The mirrors 4, 4', 5 and 5' are arranged on an intermediate wall 52. The voltage produced in the photo cell 6 is fed to the amplifier 23 through the conduits 54.

The prism 15 is arranged between the walls 14 and 53. The alternating light shutter 20 is pivoted by means of device 54 and 55 and at the same time connected with the back wall 48 of the housing. On axis 57' of the alternating shutter 20 is a disk 56. On this disk 56 runs a belt 57 which is driven by the electric motor 58. The electric motor 58 is secured to the intermediate floor 44. Simultaneously, on disk 56 runs another belt 59, which drives the alternating light shutter 3 via a disk 60 connected with axis 51. The mirrors 21, 21', 21a and 21a' are arranged on the intermediate wall 61. The voltage produced by the photoelectric cell 22 passes to the amplifier 30 via conduits 62.

The two amplifiers 23 and 30, the rectifier 24 and the relay 29 are arranged on the base wall 47 of the housing. The fine adjustment motor 25 and the coarse adjustment motor 28 are situated on the upper surface of a small box 63. The axis 64 on which control cam 7 and the bevel gear 26 are arranged is, like axis 10 of measuring prism 9, pivoted in the front and back wall of the housing. Lever 8 passes through a recess in the intermediate floor 44 and slides on the circumference of the control cam 7.

What I claim is:

1. In an arrangement for automatically adjusting an optical measuring or observation instrument to the point of the greatest local change in the illuminating intensity of a radiation field, optical means including a partial reflecting member for splitting the light emanating from said radiation field into two separate light beams, means including a photoelectric cell for producing a voltage which is proportional to the first differential quotient of the light flux emanating from said radiation field, said means being responsive to one of said two light beams, means including a photoelectric cell for producing a voltage which is proportional to the second differential quotient of said light flux, said means being responsive to the other of said two light beams, means for adjusting said measuring instrument about a single axis, means including electric motor means energized by said voltages for operating said adjusting means and means operated by the voltage produced by said first mentioned photoelectric cell for connecting and disconnecting a portion of said means for adjusting said measuring instrument when said voltage drops below a predetermied minimum value and rises above a predetermined maximum value, respectively.

2. In an arrangement for automatically adjusting an optical measuring or observation instrument to the point of the greatest local change in the illumination intensity of a radiation field as set forth in claim 1, optical means comprising two parallel slits of the same width arranged in one of said two light beams for separating said beam into two separate parallel light beams, said last named optical means producing said first and second differential quotient, a rotating alternating light shutter arranged in the path of said two parallel light beams for alternately interrupting the same, means for reflecting the two interrupted light beams onto the photocathode of a photoelectric cell common to both said light beams, means for adjusting said measuring instrument, and means including electric motor means for operating said adjusting means.

3. An arrangement according to claim 2, including means for amplifying the electric quantity produced in said photoelectric cell, and means for connecting and disconnecting said electric motor means to a constant voltage.

4. In an arrangement for automatically adjusting an optical measuring or observation instrument to the point of the greatest local change in the illumination intensity of a radiation field, as set forth in claim 1, optical means comprising three parallel slits in one of said two light beams, the center one of said three slits being twice as wide as the two outer slits which have the same width, said light beam being separated by said optical means into three separate parallel light beams of a width corresponding to the width of said respective slits, a rotating alternating light shutter arranged in the path of said three parallel light beams, said alternating light shutter being constructed so as to interrupt simultaneously the two outer light beams alternately with said center light beam, means for reflecting all of said interrupted light beams onto the photocathode of a photoelectric cell common to all of said light beams, means for adjusting said measuring instrument, and means including electric motor means energized by the electric quantity produced in said photoelectric cell for operating said adjusting means.

5. An arrangement according to claim 4, including means for amplifying the electric quantity produced in said photoelectric cell, and means for rectifying the amplified alternating voltage in synchronism with the interruptions of said light fluxes by said rotating alternating light shutter.

6. An arrangement according to claim 4, including means for amplifying the electric quantity produced in said photoelectric cell, and means for rectifying the amplified alternating voltage in synchronism with the interruptions of said light fluxes by said rotating alternating light shutter, said rectified voltage being used for energizing said electric motor means employed for effecting a fine adjustment of said instrument.

7. In an arrangement for automatically adjusting an optical measuring or observation instrument to the point of the greatest local change in the illumination intensity of a radiation field, optical means for splitting the light emanating from said radiation field into two separate light beams, optical means producing two parallel slits of the same width arranged in one of said two separated light beams for separating said beam into two separate parallel light beams, a rotating alternating light shutter arranged in the path of said two parallel light beams for alternately interrupting the same, means for reflecting the two interrupted light beams into a photoelectric cell common to both said light beams, means for adjusting said instrument including a first electric motor which is energized by a constant voltage and which is connected and disconnected by means of a relay which is actuated by the amplified and rectified voltage produced in said photoelectric cell for operating said adjusting means to effect a coarse adjustment of said instrument; another optical means producing three parallel slits in the other of said two separated light beams for separating said beam into three separate parallel light beams the center one of said three slits being twice as wide as the two outer slits which have the same width, another rotating alternating light shutter arranged in the path of said three parallel light beams, said alternating light shutter being constructed so as to interrupt simultaneously the two outer light beams alternately with said center light beam, means for reflecting all of said interrupted light beams into a second photoelectric cell common to said three light beams, and means including a second electric motor adapted to be energized by the amplified and rectified voltage produced in said second photoelectric cell for operating said adjusting means when said first electric motor has been disconnected, said second motor when energized effecting a fine adjustment of said instrument.

8. In an arrangement as set forth in claim 7, said means for adjusting said instrument including optical means such as a prism for displacing said radiation field, a control cam, a bevel gear coupled to said control cam, two further bevel gears each of which being coupled to one of said electric motors, said bevel gears engaging said first mentioned bevel gear, a pivotally mounted lever for operating said optical means, one end of this lever engaging the circumference of said control cam to be actuated by the latter upon rotation of the same.

References Cited in the file of this patent

UNITED STATES PATENTS

| | | |
|---|---|---|
| 2,462,925 | Varian | Mar. 1, 1949 |
| 2,492,148 | Herbold | Dec. 27, 1949 |
| 2,877,354 | Fairbanks et al. | Mar. 10, 1959 |